United States Patent Office 3,488,294
Patented Jan. 6, 1970

3,488,294
PROCESS OF INHIBITING CORROSION OF FERROUS METALS AND ALLOYS EMPLOYING A POLYVINYL HETEROCYCLIC POLYMER
Robert R. Annand, Derek Redmore, and Brian M. Rushton, St. Louis, Mo., assignors to Petrolite Corporation, Wilmington, Del., a corporation of Delaware
No Drawing. Filed Jan. 17, 1966, Ser. No. 520,883
Int. Cl. C23f 11/10; C08f 27/08
U.S. Cl. 252—391                                   4 Claims

ABSTRACT OF THE DISCLOSURE

Processes of inhibiting corrosion of metals such as iron, steel and ferrous alloys and of breaking oil-in-water emulsions wherein there are used polyvinyl heterocyclic polymers containing recurring units having a hydrocarbon backbone with pendent heterocyclic groups such as cyclic amidines, cyclic oxazolines and cyclic thiazolines; and also polyvinyl heterocyclic polymers containing recurring units having a hydrocarbon backbone with pendent heterocyclic groups such as cyclic oxazolines and cyclic thiazolines.

---

This invention relates to polyvinyl heterocyclic polymers. More particularly this invention relates to polymers containing the following type unit

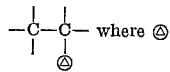

is a pendent heterocyclic ring.

The polymers are illustrated by the following structural units:

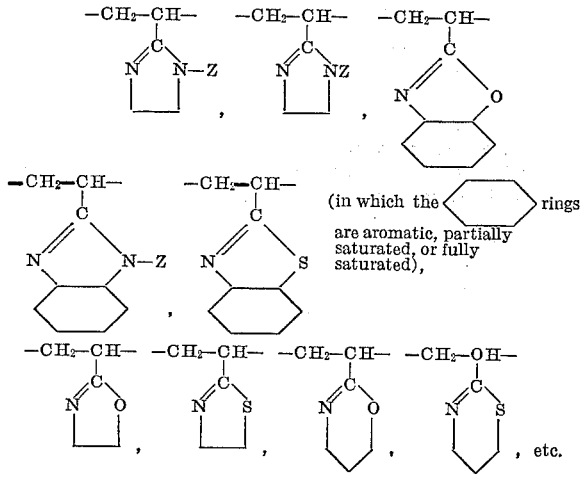

The Z groups are substituted groups, hereinafter defined. The section of the ring structure joining the heterocyclic atoms (N, O, S, etc.), may be $(CH_2)_{2-3}$ or substituted derivatives thereof, such as $(-CR_2-)_{2-3}$ where the R's (which may be the same or different) are hydrogen or a substituted group, such as a hydrocarbon group; but where substituted, the substitutions are preferably lower alkyl. The ring structure joining the heterocyclic atoms may also be part of a second ring such as an aromatic ring, a cycloaliphatic ring, etc.

These polymers may be prepared in accord with the following equation:

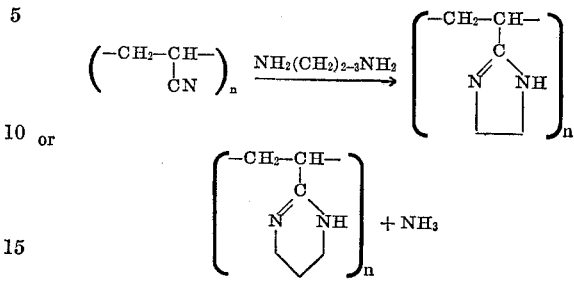

Stated another way, these polymers are prepared by reacting polyacrylonitrile with a cyclic amidine-forming polyamine, i.e. a polyamine which is capable of forming an imidazoline or a tetrahydropyrimidine.

Analogous polymers are also formed from alkanol amines and mercaptoalkyl amines, for example:

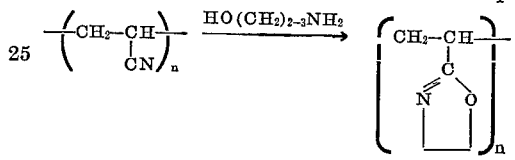

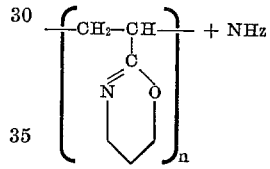

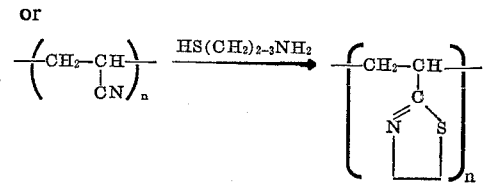

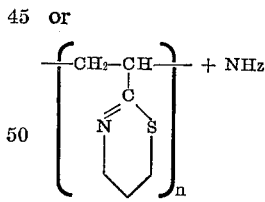

or

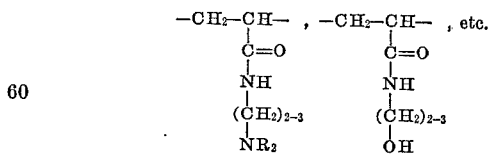

In addition to the heterocyclic units, the polymer may contain other groups beside the heterocyclic rings, for example a unit of the formula $$-CH_2-CH- \atop \begin{array}{c} C=O \\ | \\ NH \\ | \\ (CH_2)_{2-3} \\ | \\ NR_2 \end{array} \quad , \quad -CH_2-CH- \atop \begin{array}{c} C=O \\ | \\ NH \\ | \\ (CH_2)_{2-3} \\ | \\ OH \end{array} \quad , \text{etc.}$$

Stated another way, the polymer may contain one type of the heterocyclic group, or more than one type of heterocyclic groups; but in addition to the heterocyclic groups, the polymer may also contain linear groups such as amido groups, etc.

The heterocyclic ring may have side chains, for example Z of the formula $$\left[ \begin{array}{c} -CH_2-CH- \\ | \\ C \\ \diagup \diagdown \\ N \quad N-Z \\ \underline{\quad\quad\quad} \end{array} \right]_n$$

Z is generally the residuary moiety of the polyamine or a derivative thereof, for example $$-\!\!\left(\!C_nH_{2n}-\!\!\overset{R}{N}\!\!\right)_{\!a}\!\!-R$$

$$-\!\!\left(\!C_nH_{2n}-\!\!\overset{R}{N}\!\!\right)_{\!a}\!\!-\overset{O}{\overset{\|}{C}}-R$$

$$-\!\!\left(\!C_nH_{2n}-\!\!\overset{R}{N}\!\!\right)_{\!a}\!\!-C_nH_{2n}OH, \quad -\!\!\left(\!C_nH_{2n}-\!\!\overset{R}{N}\!\!\right)_{\!a}\!\!-C_nH_{2n}OR$$

$$-\!\!\left(\!C_nH_{2n}-\!\!\overset{R}{N}\!\!\right)_{\!a}\!\!\left(\!C_nH_{2n}O\!\right)_{\!b}\!\!-H, \quad -\!\!\left(\!C_nH_{2n}-\!\!\overset{R}{N}\!\!\right)_{\!a}\!\!-C_nH_{2n}O\overset{O}{\overset{\|}{C}}-R$$

$$-\!\!\left(\!C_nH_{2n}\overset{R}{N}\!\right)_{\!a}\!\!\left(\!C_nH_{2n}O\!\right)_{\!b}\!\!-\overset{O}{\overset{\|}{C}}-R, \quad -C_nH_{2n}OH$$

$$-\!\!\left(\!C_nH_{2n}O\!\right)_{\!a}\!\!-H$$

$$C_nH_{2n}OR$$

$$-\!\!\left(\!C_nH_{2n}O\!\right)_{\!a}\!\!-R, \quad -\!\!\left(\!C_nH_{2n}O\!\right)_{\!a}\!\!-\overset{O}{\overset{\|}{C}}-R, \quad -\!\!\left(\!C_nH_{2n}O\!\right)_{\!a}\!\!-\overset{O}{\overset{\|}{C}}-R$$

$$\left(\!C_nH_{2n}\overset{R}{N}\!\right)_{\!a}\!\!-C_nH_{2n}-\overset{\overset{R}{|}}{\underset{N}{\overset{C}{\diagdown}}}\!\!\!\underset{\underline{\quad\quad}}{\diagup}\!\!N\!\!-\!\!Z,\ \text{etc.}$$

The ($C_nH_{2n}NH_a$) group in the above formulae may in certain instances be acylated on one or more of these groups, for example, $$\begin{array}{cc} -C_2H_{2n}-NH & -C_nH_{2n}-N- \\ | & | \\ C=O & C=O \\ | & | \\ R & , \quad R \end{array}, \text{etc.}$$

In addition Z may also be a hydrocarbon group, for example, alkyl, alkenyl, alkynyl, aryl, alkaryl, aralkyl, cycloalkyl, etc.

In the above formulae $n$ and $a$ are numbers, for example, 1–10 or higher. The R's in the above formulae may be hydrogen or may have the same meaning as Z where it is a hydrocarbon group. In addition, R and Z may also be a substituted hydrocarbon group, etc.

The cyclic-amidine forming polyamines are those polyamines which contain at least two amino groups, one of which is a primary group and the other primary or secondary joined by a 2 or 3 carbon chain, for example —$(CH_2)_{2-3}$, or substituted derivatives thereof, such as where the hydrogens on this group are substituted with hydrocarbon groups such as alkyl, e.g. methyl, ethyl, etc., to yield for example, $$\begin{array}{cc} -CH-CH-, & -CH_2-CH-CH_2-, \text{ etc.} \\ |\quad\ | & | \\ CH_3\ CH_3 & CH_3 \end{array}$$

Other linking groups in the polyamine may contain linking chains of 2, 3 or more carbon atoms.

Theoretically the number of polyamine units may be infinite, provided there is at least one cyclic amidine forming unit on the polyamine, for example, 1–10 or more units, even 50–100 or more units where polyalkyleneimines are employed such as polyethyleneimine, polypropyleneimine, etc.

In place of one amino group on the cyclic-amidine forming unit, one may have had a hydroxy, mercapto, etc. group, for example, $NH_2(CH_2)_{2-3}OH$, $$NH_2(CH_2)_{2-3}\text{---}SH$$

or substituted derivatives thereof, (i.e. on the ($CH_2$) portion of the chain), such as where the hydrogens are substituted with hydrocarbon groups, for example, alkyl, methyl, ethyl, propyl, etc. groups.

The cyclic amidine forming group may also be derived from a compound having an auxiliary ring structure, for example aromatic alicyclic, etc., such as for example $$\begin{array}{cccccc} NH_2\ NH_2 & NH_2\ NH_2 & NH_2\ NH_2 & NH_2\ OH & NH_2\ SH \\ \diagup\diagdown & \diagup\diagdown & \diagup\diagdown & \diagup\diagdown & \diagup\diagdown \\ |\ S\ | & |\ \ \ \ | & |\ \ \ \ | & |\ \ \ \ | & |\ \ \ \ | , \text{ etc.} \\ \diagdown\diagup & \diagdown\diagup & \diagdown\diagup & \diagdown\diagup & \diagdown\diagup \end{array}$$

It should be noted in these formulae that the carbon units between the heterocyclic atoms of the cyclic amidine, or analogous ring-forming compounds, have two carbons.

Examples of polyamines are the polyalkylene polyamines for example $$NH_2\!\!\left(\!A\overset{H}{N}\!\right)\!\!-H$$

such as where A is $(CH_2)_{2-3}$, or substituted derivatives thereof, such as ethylenediamine, diethylenetriamine, triethylenetetramine, tetraethylenepentamine, etc.; propylenediamine, dipropylenetriamine, tripropylenetetramine, tetrapropylenepentamine, etc.; corresponding compounds such as $$NH_2\text{---}(CH_2)_{2-3}OH,\ NH_2(CH_2)_{2-3}\text{---}SH$$

etc.

The cyclic amidine-forming amine may also be N-substituted, for example $$R\overset{H}{\overset{|}{N}}\!\!-\!\!\left(\!A\overset{H}{\overset{|}{N}}\!\right)_{\!n}\!\!-H$$

such as where R is a hydrocarbon group, for example, alkyl, alkenyl, etc. Commercial examples of such compounds are the "Duomeens" or analogous compounds, for example $$R\overset{H}{\overset{|}{N}}(CH_2)_{2-3}NH_2$$

such as where R is a fatty group, having for example 8–30 carbon atoms such as derived from compounds of animal or vegetable origin, such as coconut oil, tallow, tall oil, soya, etc.

The polyamines may also be substituted on more than one nitrogen group provided the polyamine has a cyclic amidine-forming group.

In addition the polyamine may have any group corresponding to Z above defined, provided the polyamine has at least one cyclic amidine-forming group.

In addition to employing polyacrylonitrile one may employ substituted derivatives thereof such as $$\begin{array}{c} -CR_2-CR- \\ | \\ CN \end{array}$$

where the R's, which may be the same or different, are for example hydrogen or hydrocarbon groups such as alkyl, i.e. methyl, ethyl, etc. Substituted types which may be mentioned are methacrylonitrile, ethacrylonitrile, etc. Any suitable molecular weights can be employed. In practice we have employed molecular weights of about 500–20,000 or more but less or greater molecular weights may be employed.

Copolymers of acrylonitrile can also be employed such as hetero, block, graft, etc. polymers where the copolymeric unit is for example a hydrocarbon unit, for example ethylene, propylene, butadiene, styrene, acrylic esters, methacrylic esters, vinyl acetate, vinyl halide, etc. The copolymer units may be or may not be reactive with the amino reactant.

Although polyacrylonitriles can be reacted with cyclic amidine-forming amines or analogous compounds to form cyclic amidines and the like, the reaction is accelerated by the use of salts thereof. Both organic and inorganic salts can be employed such as sulfonic acids, etc.

The reaction can be catalyzed by the use of sulfur compounds such as $H_2S$, thioacids, thioketones, thiourea, etc.

Where higher amines are employed, it is possible to form two or more cyclic amidine groups from the same amine for example

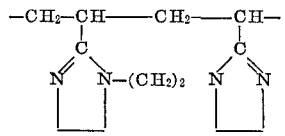

These bis cyclic amidines may or may not be on adjacent polymer units and may also be prepared from other polyamines.

In addition, a polyamine may form a plurality of cyclic amidine units so as to cross-link two polymer chains, for example,

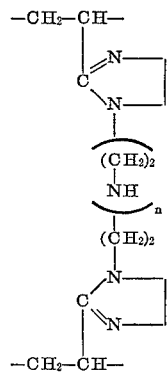

In addition cross-linking effects may be achieved by cyclic amidine-amides or by diamines, for example

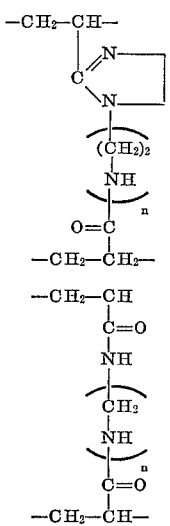

Other variations will be evident to those skilled in the art.

The polymers of this invention containing the heterocyclic pendent groups may be hydrolyzed, in whole or in part, to yield pendent amides as illustrated by the following reactions:

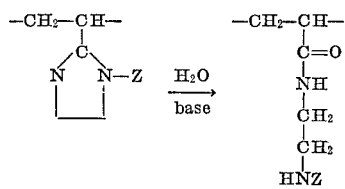

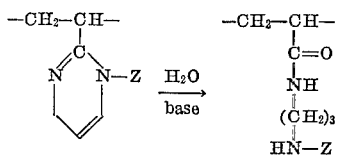

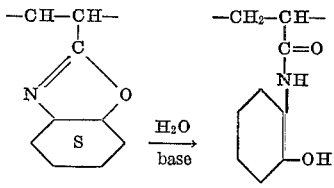

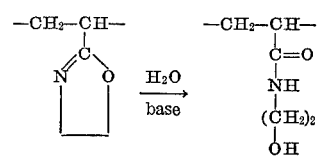

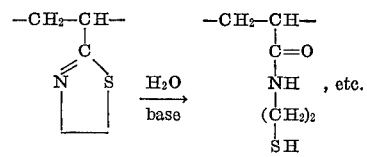

In addition to the basic form of these polymers, one may in certain instances prepare salts or quaternaries, either with organic or inorganic acids or quaternary agents such as benzyl halides, alkyl halides, etc., or dihalides such as alkylenedihalides, xylylene dihalides $$(XCH_2CH_2)_2O$$

etc. Being bases, the cyclic amidines and other analogous species readily form salts, and where they also contain other basic groups in addition to the cyclic amidine ring, such as where Z contains an amino group, they may form di- or poly-salts. Examples of acids which can be employed include HCl, $H_2SO_4$, $H_3PO_4$, hydrocarbon sulfonic acids, acetic acid, oxalic acid, maleic acid, oleic acid, abietic acid, naphthenic acid, rosin, benzoic acid, phthalic acid, diglycollic acid and the like.

The following examples are presented by way of illustration and not of limitation. The polyacrylonitrile employed in these examples had a molecular weight of about 1500.

EXAMPLE 1

Polyacrylonitrile (20 g.; 00.38 equivalent) was heated together with 2-aminoethyl ammonium p-toluene sulphonate (88 g.; 0.38 M) with stirring to 150° at which temperature evolution of ammonia commenced. The temperature was raised to 190° and maintained for 1½ hours until the ammonia evolution was complete. On cooling a viscous gum was obtained which was water soluble. The infrared spectrum showed complete absence of nitrile groups and presence of imidazoline rings. The yield was quantitative.

EXAMPLE 2

Polyacrylonitrile (20 g.; 0.38 equivalent) was heated with ethylene diamine (22.8 g.; 0.38 M) and thioacetamide (0.5 g.) at 160° for two hours. Ammonia evolution was complete at this time. On cooling a quantitative yield of viscous gum identified as the polymer of 2-vinyl imidazoline was obtained. Infrared (liquid film) showed typical imidazoline peaks at 3130 cm.$^{-1}$ (—NH) and 1599 cm.$^{-1}$ (—C=N—). The product was readily soluble in water and methanol and had a molecular weight of 2700.

EXAMPLE 3

Polyacrylonitrile (30 g.; 0.565 equivalent) was heated together with propylene diamine (42 g.; 0.565 M) and thiourea (0.6 g.) with stirring. The temperature was maintained at 190° for about 10 hours until ammonia evolution had ceased. The product, a polymer of 2-vinyl tetrahydropyrimidine was obtained as a dark viscous gum in quantitative yield. The polymer was water soluble.

EXAMPLE 4

Polyacrylonitrile (30 g.; 0.565 equivalent) was heated together with β-ethanolamine (36.4 g.; 0.565 M) and sodium methoxide (700 mg.) for 12 hours at 130°. The product consisted partly of polyvinyl oxazoline and partly hydroxyamide as judged by the infrared spectrum.

EXAMPLE 5

Polyacrylonitrile (20 g.; 0.38 equivalent) was heated with Duomeen L-11 (104 g.; 0.38 M) and thioacetamide (500 mg.) at 190° for 16 hours. The ammonia evolution was complete at this time. The product was a mobile, dark brown liquid having an infrared spectrum in agreement with a poly 2-vinyl tetrahydropyrimidine structure. The product was readily soluble in hydrocarbon solvents, but insoluble in water.

EXAMPLE 6

Reaction of polyacrylonitrile with Duomeen L-15 gave a similar product to that described in Example 5.

Since the following polyvinyl heterocyclic compounds are similarly prepared, to save repretitive details their preparation is outlined in the following table. The temperatures employed herein are ° C. and M is the abbreviation for mole.

simple in principle. The corrosion preventive reagent is dissolved in the liquid corrosive medium in small amounts and is thus kept in contact with the metal surface to be protected. Alternatively, the corrosion inhibitor may be applied first to the metal surface, either as is, or as a solution in some carrier liquid or paste. Continuous application, as in the corrosive solution, is the preferred method, however.

The present process finds particular utility in the protection of metal equipment of oil and gas wells, especially those containing or producing an acidic constituent such as $H_2S$, $CO_2$, organic acids and the like. For the protection of such wells, the reagent, either undiluted or dissolved in a suitable solvent, is fed down the annulus of the well between the casing and producing tubing where it becomes commingled with the fluid in the well and is pumped or flowed from the well with these fluids, thus contacting the inner wall of the casing, the outer and inner wall of tubing, and the inner surface of all wellhead fittings, connections and flow lines handling the corrosive fluid.

Where the inhibitor composition is a liquid, it is conventionally fed into the well annulus by means of a motor driven chemical injector pump, or it may be dumped periodically (e.g., once every day or two) into the annulus by means of a so-called "boll weevil" device or similar arrangement. Where the inhibitor is a solid, it may be dropped into the well as a solid lump or stick, it may be blown in as a powder with gas, or it may be washed in with a small stream of the well fluids or other liquid.

TABLE I

| Example | I Nitrile | II Polyamine | I Equivalents | II Mole | 1 g. Catalyst Mole Concentration Based on II | Temp. and Time of Reaction | Comments |
|---|---|---|---|---|---|---|---|
| 7 | Polyacrylonitrile | Ethylene diamine | 0.4 | 0.4 | Thioacetamide | 14 hours; 140° | Solvent, dimethyl formamide (DMF). |
| 8 | do | {Ethylene diamine / Duomeen L-11 | 0.4 | 0.3 / 0.1 | do | 22½ hours; 140° | Solvent DMF. |
| 9 | do | {Ethylene diamine / Tetraethylene pentamine | 0.4 | 0.35 / 0.05 | do | 9 hours; 170° | |
| 10 | Polymethacrylonitrile | Ethylene diamine | 0.4 | 0.4 | do | 5 hours; 150° | |
| 11 | Polyacrylonitrile | do | 0.4 | 0.4 | S plus Zn | 3 hours; 170° | Heat 1 hour with S before adding Zn. |
| 12 | do | {Duomeen L-11 / Tetraethylene pentamine | 0.4 | 0.35 / 0.05 | Thioacetamide | 30 hours; 195-200° | |
| 13 | Polymethacrylonitrile | Ethanolamine | 0.35 | 0.35 | Methoxide | 14 hours; 130° | |
| 14 | Polyacrylonitrile | {Ethylene diamine / Triethylene tetraamine | 0.4 | 0.30 / 0.10 | Thiourea | 10 hours; 175° | |
| 15 | do | β-Mercapto ethylamine | 0.4 | 0.4 | None | 2 hours; 120° | |
| 16 | do | Phenylene diamine | 0.4 | 0.4 | Thioacetamide | 8 hours; 180° | |

USE AS CORROSION INHIBITORS

This phase of this invention relates to the use of these polymers in inhibiting the corrosion of metals, most particularly iron, steel and ferrous alloys. These polymers can be used in a wider variety of applications and systems where iron, steel and ferrous alloys and affected by corrosion. They may be employed for inhibiting corrosion in processes which require this protective or passivating coating as by dissolution in the medium which comes in contact with the metal. They can be used in preventing atmospheric corrosion, underwater corrosion, corrosion in steam and hot water systems, corrosion in chemical industries, underground corrosion, etc.

The corrosion inhibitors contemplated herein find special utility in the prevention of corrosion of pipe or equipment which is in contact with a corrosive oil-containing medium, as, for example, in oil wells producing corrosive oil or oil-brine mixtures, in refineries, and the like. These inhibitors may, however, be used in other systems or applications. They appear to possess properties which impart to metals resistance to attack by a variety of corrosive agents, such as brines, weak inorganic acids, organic acids, $CO_2$, $H_2S$, etc.

The method of carrying out this process is relatively simple in principle.

Where there is gas pressure on the casing, it is necessary, of course, to employ any of these treating methods through a pressure equalizing chamber equipped to allow introduction of reagent into the chamber, equalization of pressure between chamber and casing, and travel of reagent from chamber to well casing.

Occasionally, oil and gas wells are completed in such a manner that there is no opening between the annulus and the bottom of the tubing or pump. This results, for example, when the tubing is surrounding at some point by a packing held by the casing or earth formation below the casing. In such wells the reagent may be introduced into the tubing through a pressure equalizing vessel, after stopping the flow of fluids. After being so treated, the well should be left closed in for a period of time sufficient to permit the reagent to drop to the bottom of the well.

For injection into the well annulus, the corrosion inhibitor is usually employed as a solution in a suitable solvent. The selection of solvent will depend much upon the exact reagent being used and its solubility characteristics.

For treating wells with packed-off tubing, the use of solid "sticks" or plugs of inhibitor is especially convenient. These may be prepared by blending the inhibitors with a mineral wax, asphalt or resin in a proportion sufficient to give a moderately hard and high-melting solid which can be handled and fed into the well conveniently.

The protective action of the herein described reagents appears to be maintained for an appreciable time after treatment ceases, but eventually is lost unless another application is made.

For the protection of gas wells and gas-condensate wells, the amount of corrosion inhibitor required can range from less than about ¼ to 3 lbs. or more per million cubic feet of gas produced, depending upon the amounts and composition of corrosive agents in the gas and the amount of liquid hydrocarbon and water produced. However, in no case does the amount of inhibitor required appear to be stoichiometrically related to the amount of acids produced by a well, since protection is obtained with much less corrosion inhibitor than usually would be required for neutralization of the acids produced.

These compositions are particularly effective in the prevention of corrosion in systems containing a corrosive aqueous medium, and most particularly in systems containing brines.

These polymeric reagents can also be used in the prevention of corrosion in the secondary recovery of petroleum by water flooding and in the disposal of waste water and brine from oil and gas wells. Still more particularly, they can be used in a process of preventing corrosion in water flooding and in the disposal of waste water and brine from oil and gas wells which is characterized by injecting into an underground formation an aqueous solution containing minor amounts of the compositions of this invention, in sufficient amounts to prevent the corrosion of metals employed in such operation.

When an oil well ceases to flow by the natural pressure in the formation and/or substantial quantities of oil can no longer be obtained by the usual pumping methods, various processes are sometimes used for the treatment of the oil-bearing formation in order to increase the flow of oil. These processes are usually described as secondary recovery processes. One such process which is used quite frequently is the water flooding process wherein water is pumped under pressure into what is called an "injection well" and oil, along with quantities of water, that have been displaced from the formation, are pumped out of an adjacent well usually referred to as a "producing well." The oil which is pumped from the producing well is then separated from the water that has been pumped from the producing well and the water is pumped to a storage reservoir from which it can again be pumped into the injection well. Supplementary water from other sources may also be used in conjunction with the produced water. When the storage reservoir is open to the atmosphere and the oil is subject to aeration this type of water flooding system is referred to herein as an "open water flooding system." If the water is recirculated in a closed system without substantial aeration, the secondary recovery method is referred to herein as a "closed water flooding system."

Because of the corrosive nature of oil field brines, to economically produce oil by water flooding, it is necessary to prevent or reduce corrosion since corrosion increases the cost thereof by making it necessary to repair and replace such equipment at frequent intervals.

We have now discovered a method of preventing corrosion in systems containing a corrosive aqueous media, and most particularly in systems containing brines, which is characterized by employing the compounds described herein.

We have also discovered an improved process of protecting from corrosion metallic equipment employed in secondary oil recovery by water flooding such as injection wells, transmission lines, filters, meters, storage tanks, and other metallic implements employed therein and particularly those containing iron, steel, and ferrous alloys, such process being characterized by employing in water flood operation an aqueous solution of the compositions of this invention.

The invention, then is particularly concerned with preventing corrosion in a water flooding process characterized by the flooding medium, containing an aqueous or an oil field brine solution of these compounds.

In many oil fields large volumes of water are produced and must be disposed of where water flooding operations are not in use or where water flooding operations cannot handle the amount of produced water. Most states have laws restricting pollution of streams and land with produced waters, and oil producers must then find some method of disposing of the waste produced salt water. In many instances therefore, the salt water is disposed of by injecting the water into permeable low pressure strata below the fresh water level. The formation into which the water is injected is not the oil producing formation and this type of disposal is defined as salt water disposal or waste water disposal. The problems of corrosion of equipment are analogous to those encountered in the secondary recovery operation by water flooding.

The compositions of this invention can also be used in such water disposal wells thus providing a simple and economical method of solving the corrosion problems encountered in disposing of unwanted water.

Water flood and waste disposal operations are too well known to require further elaboration. In essence, in the present process, the flooding operation is effected in the conventional manner except that the flooding medium contains a minor amount of these compounds, sufficient to prevent corrosion.

While the flooding medium employed in accordance with the present invention contains water or oil field brine and the compounds of this water, the medium may also contain other materials. For example, the flooding medium may also contain other agents such as surface active agents or detergents which aid in wetting throughout the system and also promote the desorption of residual oil from the formation, sequestering agents which prevent the deposition of calcium and/or magnesium compounds in the interstices of the formation, bactericides which prevent the formation from becoming plugged through bacterial growth, tracers, etc. Similarly, they may be employed in conjunction with any of the operating techniques commonly employed in water flooding and water disposal processes, for example five spot flooding, peripheral flooding, etc. and in conjunction with other other secondary recovery methods.

The concentration of the corrosion inhibitors of this invention will vary widely depending on the particular composition, the particular system, etc. Concentrations of at least about 0.25 p.p.m., such as about .75 to 7,500 p.p.m. for example about 1 to 5,000 p.p.m. advantageously about 10 to 1,000 p.p.m., but preferably about 15–250 p.p.m. may be employed. Larger amounts can also be employed such as 1.5–5.0% although there is generally no commercial advantage in so doing.

For example, since the success of a water flooding operation manifestly depends upon its total cost being less than the value of the additional oil recovered from the oil reservoir, it is quite important to use as little as possible of these compounds consistent with optimum corrosion inhibition. Since these compounds are themselves inexpensive and are used in low concentrations, they enhance the success of a flood operation by lowering the cost thereof.

By varying the constituents of the composition, the compounds of this invention can be made more oil or more water soluble, depending on whether the composition is to be employed in oil or water systems.

Although the manner of practicing the present invention is clear from the foregoing description, the following non-limiting specific examples are included for purposes of illustration.

EXAMPLES

These tests were run under conditions so set up as to simulate those found in an actual producing well. The test procedure involved the measurement of the corrosive action of fluids inhibited by the compositions herein described upon sandblasted SAE 1020 steel coupons measuring ¼ inch in diameter and being 4 inches long when compared to test coupons containing no inhibitor and commercial inhibitors.

Clean pint bottles were half-filled (almost 200 ml.) with sea-water (i.e., tap water containing 3% by weight of the salts magnesium chloride, calcium chloride, sodium sulfate and sodium chloride) which had been saturated with hydrogen sulfide. Those requiring inhibitor were charged with the same by pipetting calculated amounts contained in suitable solvents (water, isopropyl alcohol; mineral spirits) to give the required parts per million of inhibitor. Uninhibited blanks were run in conjunction with inhibited solutions. The bottles were now filled (total volume now about 400 ml.) leaving a small air space to allow for expansion. The weighed coupons attached to sealing caps were screwed onto the bottles and they were placed on a rotating wheel for seven days at 115° F. The coupons were then removed, cleaned electrolytically in 5% sulfuric acid (using the coupons as a cathode) and washed successively with dilute sodium hydroxide, twice with water, once with acetone and finally dried.

When the inhibitor was oil-soluble as contrasted to water-soluble, a two-phase system was used instead of the "all-brine system" and this simply consisted of using hydrogen sulfide saturated mineral spirits to replace 25% by volume of the brine.

The changes in the weights of the coupons during the corrosion test were taken as a measurement of the effectiveness of the inhibitor compositions. Protective percentage was calculated for each test coupon taken from the inhibited fluids in accordance with the following formula:

$$\frac{W_1 - W_2}{W_1} \times 100 = \text{percent protection}$$

in which $W_1$ is the loss in weight of the coupon taken from uninhibited fluids and $W_2$ is the loss in weight of coupons which were subjected to inhibited fluids.

The results obtained are presented in the following table. All of the compositions prepared in Table I Examples 1–16 prevent corrosion. The following examples are exemplary of the performance of the present corrosion inhibitors as compared to the best commercial inhibitor for the corrosion system.

TABLE II.—POLYVINYL HETEROCYCLES
[Corrosion Data]

| | Percent Protection of Given p.p.m. of Inhibitor | | | |
|---|---|---|---|---|
| | P.P.M. | | | |
| | 4 | 8 | 16 | 32 |
| Example: | | | | |
| 1 | 20 | 30 | 75 | 92 |
| 2 | 37 | 95 | 98 | 100 |
| 3 | 10 | 86 | 88 | 86 |
| 4 | 48 | 60 | 68 | 88 |
| 7 | 37 | 81 | 92 | 92 |
| 8 | 47 | 65 | 93 | 95 |
| 9 | 20 | 88 | 92 | 94 |
| 10 | 56 | 94 | 99 | 98 |
| Commercial Inhibitor | 5 | 28 | 66 | 99 |

These polymeric materials can also be employed in conjunction with other corrosion inhibitors, for example of the film-forming type. Non-limiting examples include the acylated polyamines such as described in U.S. Patents Re. 23,227, 2,466,517, 2,468,163, 2,598,213 and 2,640,029. These acylated polyamines may be described as amides, imidazolines, tetrahydropyrimidines, etc.

BREAKING OIL-IN-WATER EMULSIONS

The polymers of this invention can also be used in a process for resolving or separating emulsions of the oil-in-water class, by subjecting the emulsion to these polymers.

Emulsions of the oil-in-water class comprise organic oily materials, which, although immiscible with water or aqueous or non-oily media, are distributed or dispersed as small drops throughout a continuous body of non-oily medium. The proportion of dispersed oily material is in many and possibly most cases a minor one.

Oil-field emulsions containing small proportions of crude petroleum oil relatively stably dispersed in water or brine are representative oil-in-water emulsion. Other oil-in-water emulsions include: steam cylinder emulsions, in which traces of lubricating oil are found dispersed in condensed steam from steam engines and steam pumps, wax-hexane-water emulsions, encountered in de-waxing operations in oil refining; butadiene tar-in-water emulsions, in the manufacture of butadiene from heavy naphtha by cracking in gas generators, and occuring particularly in the wash box waters of such systems; emulsions of "flux oil" in steam condensate produced in the catalytic dehydrogenation of butylene to produce butadiene; styrene-in-water emulsions, in synthetic, rubber plants; synthetic latex-in-water emulsions, in plants producing copolymer butadiene-styrene or GRS synthetic rubber; oil-in-water emulsions occuring in the cooling water systems of gasoline absorption plants; pipe press emulsions from steam-actuated presses in clay pipe manufacture; emulsions of petroleum residues-in-diethylene glycol, in the dehydration of natural gas.

In other industries and arts, emulsions of oily materials in water or other non-oily media are encountered, for example, in sewage disposal operations, synthetic resin emusions paint formulation, milk and mayonnaise processing, marine ballast water disposal, and furniture polish formulation. In cleaning the equipment used in processing such products, diluted oil-in-water mulsions are inadvertently, incidentally, or accidentally produced. The disposal of aqueous wastes is, in general, hampered by the presence of oil-in-water emulsions.

Essential oils comprise non-saponifiable materials like terpenes, lactones, and alcohols. They also contain saponifiable esters or mixtures of saponifiable and non-saponifiable materials. Steam distillation and other production procedures sometimes cause oil-in-water emulsions to be produced, from which the valuable essential oils are difficult to recover.

In all such examples, a non-aqueous or oily material is emulsified in an aqueous or non-oily material with which it is naturally immisicible. The term "oil" is used herein to cover broadly the water-immiscible materials present as dispersed particles in such systems. The non-oily phase obviously includes diethylene glycol, aqueous solutons, and other non-oily media in addition to water itself.

The foregoing examples illustrate the fact that, within the broad genus of oil-in-water emulsions, there are at least three important sub-genera. In these, the dispersed oily material is respectively non-saponifiable, saponifiable, and a mixture of non-saponifiable and saponifiable materials. Among the most important emulsion of non-saponifiable material in water are petroleum oil-in-water emulsions. Saponifiable oil-in-water emulsions have dispersed phases comprising, for example, saponifiable oils and fats and fatty acids, and other saponifiable oily or fatty esters and the organic components of such esters to the extent such components are immiscible with aqueous media. Emulsions produced from certain blended lubricating compositions containing both mineral and fatty oil ingredients are examples of the third-sub-genus.

Oil-in-water emulsions contain widely different proportions of dispersed phase. Where the emulsion is a waste product resulting from the flushing with water of manufacturing areas or equipment, the oil content may be only a few parts per million. Resin emulsion paints, as produced, contain a major proportion of dispersed phase. Naturally-occurring oil-field emulsions of the oil-in-water class carry crude oil in proportions varying from a few parts per million to about 20%, or even higher in rare cases.

The present invention is concerned with the resolution of those emulsions of the oil-in-water class which contain a minor proportion of dispersed phase, ranging from 20% down to a few parts per million. Emulsions containing more than about 20% of dispersed phase are commonly of stability as to be less responsive to the present polymers, possibly because of the appreiable content of emulsifying agent present in such systems, whether intentionally incorporated for the purpose of stabilizing them, or not.

Although the present invention relates to emulsions containing as much as 20% dispersed oily material, many if not most of them contain appreciably less than this proportion of dispersed phase. In fact, most of the emulsions encountered in the development of this invention have contained about 1% or less of dispersed phase. It is to such oil-in-water emulsions having dispersed phase volumes of the order of 1% or less to which the present process is particularly directed. This does not means that any sharp line of demarcation exists and that, for example, an emulsion containing 1.0% of dispersed phase will respond to the process, whereas one containing 1.1% of the same dispersed phase will remain unaffected; but that, in general, dispersed phase proportions of the order of 1% or less appear most favorable for application of the present process.

In emulsions having high proportions of dispersed phase, appreciable amounts of some emulsifying agent are probably present, to account for their stability. In the case of more dilute emulsions, containing 1% or less of dispersed phase, there may be difficulty in accounting for their stability on the basis of the presence of an emulsifying agent in the conventional sense. For example, steam condensate frequently contains very small proportions of refined petroleum lubricating oil in extremly stable dispersion; yet neither the steam condensate nor the refined hydrocarbon oil would appear to contain anything suitable to stabilize the emulsion. In such cases, emulsion stability must probably be predicated on some basis other than the presence of an emulsifying agent.

The present process, as stated above, appears to be effective in resolving emulsions containing up to about 20% of dispersed phase. It is particularly effective on emulsions containing not more than 1% of dispersed phase, which emulsions are the most important, in view of their common occurrence.

The present process is not believed to depend for its effectiveness on the application of any simple laws, because it has a high level of effectiveness when used to resolve emulsions of widely different composition, e.g., crude or refined petroleum in water or diethylene glycol, as well as emulsions of oily materials like animal or vegetable oils or synthetic oily materials in water.

Some emulsions are by-products of manufacturing procedures in which the composition of the emulsion and its ingredients is known. In many instances, however, the emulsions to be resolved are either naturally-occurring or are accidentally or unintentionally produced; or in any event they do not result from a deliberate or premeditated emulsification procedure. In numerous instances, the emulsifying agent is unknown and as a matter of fact, an emulsifying agent in the conventional sense, may be felt to be absent. It is obviously very difficult or even impossible to recommend a resolution procedure for the treatment of such latter emulsions, on the basis of theoretical knowledge. Many of the most important applications of the present process are concerned with the resolution of emulsions which are either naturally-occurring or are accidentally, un-intentionally, or unavoidably produced. Such emulsions are commonly of the most dilute type, containing about 1% or less of dispersed phase, although concentrations up to 20% are herein included, as stated above.

The process which constitutes the present invention consists in subjecting an emulsion of the oil-in-water class to the action of the polymer of the kind described, thereby causing the oil particles in the emulsion to coalesce sufficiently to rise to the surface of the non-oily layer (or settle to the bottom, if the oil density is greater), when the mixture is allowed to stand in the quiescent state after treatment with the polymer reagent or demulsifier.

Applicability of the present process can be readily determined by direct trial on any emulsion, without reference to theoretical considerations. This fact facilitates its application to naturally-occurring emulsions, and to emulsions accidentally, unintentionally, or unavoidably produced; since no laboratory experimentation, to discover the nature of the emulsion components or of the emulsifying agent, is required.

The present reagents are useful because they are able to recover the oil from oil-in-water class emulsions more advantageously and at lower cost than is possible using other reagents or other processes. In some instances, they have been found to resolve emulsions which were not economically or effectively resolvable by any other known means.

These polymeric reagents are useful in undiluted form or diluted with any suitable solvent. Water is commonly found to be a highly satisfactory solvent, because of its ready availability and negligible cost; but in some cases, non-aqueous solvents such as aromatic petroleum solvent may be found preferable. The products themselves may exhibit solubilities ranging from rather modest water-dispersibility to full and complete dispersibility in that solvent. Because of the small proportions in which our reagents are customarily employed in practicing my process, apparent solubility in bulk has little significance. In the extremely low concentrations of use they undoubtedly exhibit appreciable water-solubility of water-dispersibility as well as oil-solubility or oil-dispersibility.

These polymeric reagents may be employed alone, or they may in some instances be employed to advantage admixed with other and compatible oil-in-water demulsifiers.

This process is commonly practiced simply by introducing sufficient but minor proportions of the reagent into an oil-in-water class emulsions, agitating to secure distribution of the reagent and incipent coalescence, and letting stand until the oil phase separates. The proportion of reagent required will vary with the character of the emulsion to be resolved. Ordinarily, proportions of reagent required are from at least about 0.005 p.p.m.–10,000 p.p.m. such as 1–1,000 p.p.m., for example about 3–300 p.p.m., but preferably 5–50 p.p.m., based on the volume of emulsions treated; but more is sometimes required. Since the economics of the process are important, no more is employed than is required for effective separation. We have found that such factors as reagents, feed rate, agitation and settling time are somewhat interrelated. For example, we have found that if sufficient agitation of proper character is employed, the settling time is shortened materially. On the other hand, if satisfactory agitation is not available, but extended settling time is, the process is equally productive of satisfactory results.

Agitation may be achieved by any available means. In many cases, it is sufficient to introduce the polymeric reagent into the emulsion and use the agitation produced as the latter flows through a conduit or pipe. In some cases, agitation and mixing are achieved by stirring together or shaking together the emulsion and reagent. In some instances, distinctly improved results are obtained by the use of air or other gaseous medium. Where the volume of gas employed is relatively small and the conditions of its introduction relatively mild, it behaves as a means of securing ordinary agitation. Where aeration is effected by introducing a gas directly under pressure or from porous plates or by means of aeration cells, the effect is often importantly improved, until it constitutes a difference in kind rather than degree. A sub-aeration type flotation cell, of the kind commonly employed in ore beneficiation operations, is an extremely useful adjunct in the application of my reagents to many emulsions. It frequently accelerates the separation of the emulsion, reduces reagent requirements, or produces an improved effluent. Sometimes all three improvements are observable.

Heat is ordinarily of little importance in resolving oil-in-water class emulsions with our reagents. Still there are some instances where heat is a useful adjunct. This is especially true where the viscosity of the continuous phase of the emulsion is appreciably higher than that of water.

In some instances, importantly improved results are obtained by adjusting the pH of the emulsion to be treated to an experimentally determined optimum value.

The polymeric reagent feed rate also has an optimum range, which is sufficiently wide, however, to meet the tolerances required for the variances encountered daily in commercial operations. A large excess of reagent can produce distinctly unfavorable results.

The manner of practicing the present invention is clear from the foregoing description. However, for completeness the following non-limiting specific examples are included for purposes of illustration.

An oil-in-water petroleum emulsion was treated as follows:

A series of four bottles of the emulsion were treated with the polymeric reagents in the following concentrations 30, 15, 7.5 and 3.75 p.p.m., based on the emulsion. A commercial oil-in-water demulsifier was run as a control and at the same concentrations in the form of the polymeric reagent after sufficient agitation, in the form of 130 shakes per minute for 5 minutes. The bottles were observed and comparisons drawn between the effect of the polymeric reagent and the commercial demulsifier as to which gave the clear water layer.

In all cases employing the polymeric reagents of Tables I, Examples 1 to 16 it was found that the polymeric reagents of this invention were far superior to the commercial demulsifier. After selecting the demulsifier by the above procedure, the demulsifier is employed in a commercial application. The following illustrates commercial applications of this invention.

COMMERCIAL EXAMPLE I

Our process is practiced on location by flowing the well fluids, consisting of free crude oil, oil-in-water emulsion, and natural gas, through a gas separator, then to a steel tank of 5,000-barrel capacity. In this tank, the oil-in-water emulsion falls to the bottom and is so separated from the free oil. The oil-in-water emulsion is withdrawn from the bottom of this tank, and the demulsifier selected is introduced into the stream at this point. Depending on the emulsion, the proper proportion of demulsifier is employed.

The chemicalized emulsion flows to a second tank, mixing being achieved in the pipe. In the second tank it is allowed to stand quiescent. Clear water is withdrawn from the bottom of this tank, separated oil from the top.

COMMERCIAL EXAMPLE II

This is an example of the application of the aeration step in this process. The emulsion is a naturally-occurring petroleum oil-in-water emulsion. It is placed in a sub-aeration flotation cell of the type commonly employed in the ore beneficiation industry. The stirring mechanism is started to begin introduction of the air, and at the same time the mixture of the selected demulsifier is added in the proper proportions of demulsifier to emulsion. Clear examples are taken from the bottom of the machine.

This example illustrates the beneficial influence of the aeration technique. In most cases, it accelerates separation. In some, it permits use of smaller proportions of reagent; but in some cases, it achieves resolution, whereas, in absence of its use, satisfactory separation may not be achieved in reasonable time with reasonable reagent consumption.

Our reagents have likewise been successfully applied to other oil-in-water class emulsions, of which representative examples have been referred to above. Their use is, therefore, not limited to crude petroleum-in-water emulsions.

OTHER DERIVATIVES

These products may be further reacted to form derivatives thereof, for example, they may be oxylkylated with alkylene oxides such as ethylene oxide, propylene oxide, butylene oxide, octylene oxide, alone or in combination; with styrene oxide, glycide, methyl glycide, allyl glycidyl ether, glycidyl isopropyl ether, glycidyl phenylether, diepoxides, polyepoxides, etc.

They may be reacted with alkylene imines such as ethyleneimine, propylene imine, etc., dialkylamino-epoxypropane of the structure

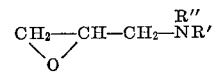

where the R's are alkyl, etc.

They may be acylated with monocarboxylic acids, such as aromatic acids, fatty acids, aliphatic acids, etc. and polycarboxylic acids, aliphatic dicarboxylic acids, aromatic dicarboxylic acids for example diglycollic, phthalic, succinic, etc., acids.

These compounds may also be treated with more than one agent, for example, they may be partially acylated, then oxyalkylated, partially oxyalkylated then acylated, etc.

Salts may be formed of these polymers as derivatives for example salts of either organic or inorganic acids such as acetic acid, glycollic acid, fatty acids, benzoic acid, etc. HCl, sulfuric acids, etc.

OTHER USES

In addition to the uses described above, these compositions and/or derivatives thereof, can be used as follows:
(1) as demulsifiers for oil-in-water emulsions
(2) as biocides i.e. bactericides, algicides, etc.
(3) as additives to various petroleum fuels including gasoline, diesel fuel, jet fuels, etc.
(4) as gasoline anti-icers and anti-stallers
(5) as flotation agents, such as flotation collection agents
(6) as asphalt emulsifiers and anti-stripping agents for asphalt-mineral aggregate compositions
(7) as emulsifiers, for example, in metal cleaners, auto polishes, wax emulsions, etc.
(8) as additives for sludging oil and cutting oils
(9) as fuel "dehazing" agents
(10) as agents for preparing emulsions for the "hydrofrac" process of enhancing oil recovery
(11) as agents to prepare polymer emulsions
(12) as agents of solvents to inhibit paraffin deposition
(13) as agents for the textile industry such as mercerizing assistants, wetting agents, rewetting agents, penetrating agents, dispersing agents, softening agents, dyeing assistants, etc.
(14) as anti-static agents for textiles, plastics, etc.
(15) as agents in leather processing
(16) as lube oil additives
(17) as emulsifiers for insecticidal and agricultural compositions
(18) as additives for rubber latices, for example, to prevent acid coagulation

(19) as additives in the production of latex foam rubber, for example, as gel sensitizers and processing aids in the manufacture of foam rubber

(20) as additives for pigment dispersion in various applications such as paints, plastic, rubber, etc.

(21) as additives for primer paints to help insure adhesion to metallic surfaces

(22) as additives useful as a freeze-thaw stabilizer for latex-base paints

(23) as agents for the pulp and paper industry, such as sizing aids, etc.

(24) as general metal deactivators

(25) as flocculation agents.

Having thus described our invention what we claim as new and desire to obtain by Letters Patent is:

1. A process of inhibiting corrosion of ferrous metals and alloys which is characterized by contacting said ferrous metals and alloys with a polyvinyl heterocyclic polymer containing recurring units of the formula

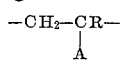

wherein R is a member selected from the group consisting of hydrogen, methyl and ethyl and A is a heterocyclic group selected from the group consisting of (1) imidazolines and tetrahydropyrimidines, (2) oxazoline and (3) thiazoline, said polymer being prepared by reacting at a temperature in the range of from about 120° C. to about 200° C. a compound selected from the group consisting of a polyacrylonitrile, a polymethacrylonitrile and a polyethacrylonitrile, said compound having a molecular weight in the range of about 500 to about 20,000, with a compound selected from the group consisting of (1) an ethylene polyamine and propylene polyamine to form the polymer wherein A is selected from the group consisting of imidazolines and tetrahydropyrimidines, (2) ethanolamine to form a polymer wherein A is oxazoline and (3) mercaptoethylamine to form a polymer wherein A is thiazoline, the carbon atom joining the heterocyclic atoms of said heterocyclic group A to the polymer chain being attached to the carbon atom of the —CR— portion of said polymer chain.

2. The process of claim 1 wherein the heterocyclic group A is selected from the group consisting of imidazolines and tetrahydropyrimidines.

3. The process of claim 1 wherein the heterocyclic group A is an oxazoline group.

4. The process of claim 1 wherein the heterocyclic group A is a thiazoline group.

References Cited

UNITED STATES PATENTS

| | | | |
|---|---|---|---|
| 2,468,163 | 4/1949 | Blair et al. | 252—8.55 |
| 2,636,038 | 4/1953 | Brandner | 252—392 X |
| 2,840,545 | 6/1958 | Yost | 252—392 X |
| 2,819,284 | 1/1958 | Shen | 252—390 X |
| 2,924,571 | 2/1960 | Hughes | 252—390 X |
| 3,262,791 | 7/1966 | Dickson et al. | 252—392 X |
| 3,288,707 | 11/1966 | Hurwitz et al. | 260—309.6 X |
| 3,300,406 | 1/1967 | Pollio | 260—309.6 X |

HERBERT B. GUYNN, Primary Examiner

260—88.3, 88.7, 243, 244, 251, 304, 307, 309.2, 309.6, 306.7; 252—8.55, 8.8, 47, 50, 51.5, 344, 390, 392; 21—2.7; 44—62, 63; 210—54; 424—78, 251, 270, 272, 273